United States Patent
Varadarajan et al.

(10) Patent No.: US 10,579,349 B2
(45) Date of Patent: *Mar. 3, 2020

(54) VERIFICATION OF A DATAFLOW REPRESENTATION OF A PROGRAM THROUGH STATIC TYPE-CHECKING

(71) Applicant: Microsoft Technology Licensing, LLC, Redmond, WA (US)

(72) Inventors: Krishnan Varadarajan, Redmond, WA (US); Michael L. Chu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,752

(22) Filed: Sep. 12, 2017

(65) Prior Publication Data
US 2018/0004495 A1   Jan. 4, 2018

Related U.S. Application Data

(63) Continuation of application No. 12/954,915, filed on Nov. 29, 2010, now Pat. No. 9,760,348.

(51) Int. Cl.
*G06F 8/41*   (2018.01)

(52) U.S. Cl.
CPC ............. *G06F 8/433* (2013.01); *G06F 8/437* (2013.01)

(58) Field of Classification Search
CPC . G06F 8/41; G06F 8/443; G06F 8/437; H04L 67/2823

(Continued)

(56) References Cited

U.S. PATENT DOCUMENTS 6,182,277 B1   1/2001   DeGroot et al.
6,321,373 B1   11/2001  Ekanadham et al.
(Continued)

FOREIGN PATENT DOCUMENTS

| CN | 1653439 A    | 8/2005  |
| JP | 2007328415 A | 12/2007 |
| WO | 2012047554 A1 | 4/2012 |

OTHER PUBLICATIONS

Polychronopoulos, Constantine, "The Hierarchical Task Graph and its Use in Auto-Scheduling", ACM, 1991, 12pg. (Year: 1991).*

(Continued)

*Primary Examiner* — Ryan D. Coyer
(74) *Attorney, Agent, or Firm* — Dicke, Billig & Czaja, PLLC

(57) ABSTRACT

Functionality is described for providing a compiled program that can be executed in a parallel and a distributed manner by any selected runtime environment. The functionality includes a compiler module for producing the compiled program based on a dataflow representation of a program (i.e., a dataflow-expressed program). The dataflow-expressed program, in turn, includes a plurality of tasks that are connected together in a manner specified by a graph (such as a directed acyclic graph). The compiler module also involves performing static type-checking on the dataflow-expressed program to identify the presence of any mismatch errors in the dataflow-expressed program. By virtue of this approach, the above-described functionality can identify any errors in constructing the graph prior to its instantiation and execution in a runtime environment.

20 Claims, 10 Drawing Sheets

(58) Field of Classification Search
USPC .......................................................... 717/147
See application file for complete search history.

(56) References Cited

U.S. PATENT DOCUMENTS

| | | | |
|---|---|---|---|
| 6,457,172 | B1 | 9/2002 | Carmichael et al. |
| 7,000,151 | B2 | 2/2006 | Dwyer |
| 7,055,142 | B2 | 5/2006 | Meredith et al. |
| 7,100,164 | B1 | 8/2006 | Edwards |
| 7,210,145 | B2 | 4/2007 | Srinivasan |
| 7,401,329 | B2 | 7/2008 | De Rijck |
| 7,415,700 | B2 | 8/2008 | Pomaranski et al. |
| 7,458,066 | B2 | 11/2008 | Rhine |
| 7,660,884 | B2 | 2/2010 | Pu |
| 7,676,791 | B2 | 3/2010 | Hamby et al. |
| 7,739,663 | B2 | 6/2010 | Newcomb, Jr. |
| 9,600,250 | B2 | 3/2017 | Varadarajan et al. |
| 9,600,255 | B2 | 3/2017 | Varadarajan et al. |
| 9,658,890 | B2 | 5/2017 | Varadarajan et al. |
| 2003/0229639 | A1 | 12/2003 | Carlson et al. |
| 2004/0015502 | A1 | 1/2004 | Alexander et al. |
| 2004/0098374 | A1 | 5/2004 | Bayliss et al. |
| 2004/0205179 | A1 | 10/2004 | Hunt et al. |
| 2005/0166182 | A1 | 7/2005 | Wang et al. |
| 2007/0027912 | A1 | 2/2007 | Chrysanthakopoulos |
| 2007/0214171 | A1 | 9/2007 | Behnen et al. |
| 2007/0245319 | A1 | 10/2007 | Muenkel et al. |
| 2008/0201721 | A1 | 8/2008 | Little et al. |
| 2008/0271042 | A1 | 10/2008 | Musuvathi et al. |
| 2008/0282238 | A1 | 11/2008 | Meijer et al. |
| 2009/0158248 | A1 | 6/2009 | Linderman et al. |
| 2009/0183144 | A1 | 7/2009 | Aupperle et al. |
| 2009/0292797 | A1 | 11/2009 | Cromp et al. |
| 2009/0307660 | A1 | 12/2009 | Srinivasan |
| 2009/0327458 | A1 | 12/2009 | Liu et al. |
| 2010/0088666 | A1* | 4/2010 | Box .......................... G06F 8/42 717/104 |
| 2010/0153959 | A1 | 6/2010 | Song et al. |
| 2010/0175049 | A1 | 7/2010 | Ramsey et al. |
| 2010/0250564 | A1 | 9/2010 | Agarwal et al. |
| 2012/0089967 | A1 | 4/2012 | Varadarajan et al. |
| 2012/0089968 | A1 | 4/2012 | Varadarajan et al. |
| 2012/0089969 | A1 | 4/2012 | Varadarajan et al. |
| 2017/0192761 | A1 | 7/2017 | Varadarajan et al. |
| 2017/0192762 | A1 | 7/2017 | Varadarajan et al. |

OTHER PUBLICATIONS

"Concurrency Runtime Versus Other Concurrency Models", Retrieved From <<https://web.archive.org/web/20100727180932/http://msdn.microsoft.com:80/en-us/library/dd998048.aspx>>, Jul. 16, 2010, 4 Pages.
"New Common Knowledge at Era of Multi-Core: Usage of CPU", in Software Design, Gijutsu-Hyohron Co., Ltd., vol. 225, Jul. 18, 2009, pp. 84-91.
"Notice of Allowance Issued in Korean Patent Application No. 10-2013-7008779", dated Oct. 30, 2017, 4 Pages.
"Office Action Issued in Korean Patent Application No. 10-2013-7008779", dated Mar. 22, 2017, 10 Pages.
"European Search Report Issued in European Patent Application No. 11831225.5", dated Dec. 11, 2014, 6 Pages.
"Final Office Action Issued in U.S. Appl. No. 12/900,696", dated Oct. 29, 2014, 17 Pages.
"Final Office Action Issued in U.S. Appl. No. 12/900,696", dated Dec. 5, 2013, 14 Pages.
"Final Office Action Issued in U.S. Appl. No. 12/900,696", dated Oct. 8, 2015, 18 Pages.
"Non-Final Office Action Issued in U.S. Appl. No. 12/900,696", dated Jun. 9, 2016, 16 Pages.
"Non-Final Office Action Issued in U.S. Appl. No. 12/900,696", dated Apr. 7, 2015, 17 Pages.
"Non-Final Office Action Issued in U.S. Appl. No. 12/900,696", dated Jun. 19, 2014, 16 Pages.
"Non-Final Office Action Issued in U.S. Appl. No. 12/900,696", dated Aug. 19, 2013, 14 Pages.
"Notice of Allowance Issued in U.S. Appl. No. 12/900,696", dated Nov. 4, 2016, 5 Pages.
"Notice of Allowance Issued in U.S. Appl. No. 12/900,696", dated Nov. 16, 2016, 2 Pages.
"Notice of Allowance Issued in U.S. Appl. No. 12/900,696", dated Dec. 12, 2016, 2 Pages.
"Final Office Action Issued in U.S. Appl. No. 12/900,705", dated Dec. 4, 2014, 20 Pages.
"Final Office Action Issued in U.S. Appl. No. 12/900,705", dated Jan. 13, 2016, 19 Pages.
"Final Office Action Issued in U.S. Appl. No. 12/900,705", dated Aug. 15, 2013, 33 Pages.
"Non-Final Office Action Issued in U.S. Appl. No. 12/900,705", dated May 7, 2014, 33 Pages.
"Non-Final Office Action Issued in U.S. Appl. No. 12/900,705", dated Jan. 25, 2013, 32 Pages.
"Non-Final Office Action Issued in U.S. Appl. No. 12/900,705", dated Jul. 7, 2015, 18 Pages.
"Non-Final Office Action Issued in U.S. Appl. No. 12/900,705", dated Jun. 30, 2016, 20 Pages.
"Notice of Allowance Issued in U.S. Appl. No. 12/900,705", dated Feb. 15, 2017, 2 Pages.
"Notice of Allowance Issued in U.S. Appl. No. 12/900,705", dated Mar. 27, 2017, 2 Pages.
"Notice of Allowance Issued in U.S. Appl. No. 12/900,705", dated Jan. 20, 2017, 5 Pages.
"Final Office Action Issued in U.S. Appl. No. 12/900,708", dated May 10, 2016, 24 Pages.
"Final Office Action Issued in U.S. Appl. No. 12/900,708", dated May 28, 2015, 22 Pages.
"Final Office Action Issued in U.S. Appl. No. 12/900,708", dated May 22, 2014, 36 Pages.
"Non-Final Office Action Issued in U.S. Appl. No. 12/900,708", dated Sep. 12, 2014, 22 Pages.
"Non-Final Office Action Issued in U.S. Appl. No. 12/900,708", dated Oct. 7, 2015, 24 Pages.
"Non-Final Office Action Issued in U.S. Appl. No. 12/900,708", dated Oct. 11, 2013, 34 Pages.
"Notice of Allowance Issued in U.S. Appl. No. 12/900,708", dated Nov. 3, 2016, 5 Pages.
"Final Office Action Issued in U.S. Appl. No. 12/954,915", dated Jan. 12, 2017, 20 Pages.
"Final Office Action Issued in U.S. Appl. No. 12/954,915", dated Jan. 13, 2016, 19 Pages.
"Final Office Action Issued in U.S. Appl. No. 12/954,915", dated Jun. 19, 2014, 19 Pages.
"Final Office Action Issued in U.S. Appl. No. 12/954,915", dated Jan. 14, 2015, 19 Pages.
"Non-Final Office Action Issued in U.S. Appl. No. 12/954,915", dated Sep. 29, 2014, 21 Pages.
"Non-Final Office Action Issued in U.S. Appl. No. 12/954,915", dated Nov. 8, 2013, 18 Pages.
"Non-Final Office Action Issued in U.S. Appl. No. 12/954,915", dated Jul. 8, 2015, 18 Pages.
"Non-Final Office Action Issued in U.S. Appl. No. 12/954,915", dated Jun. 30, 2016, 18 Pages.
"Notice of Allowance Issued in U.S. Appl. No. 12/954,915", dated May 5, 2017, 9 Pages.
"First Office Action and Search Report Issued in Chinese Patent Application No. 201110314213.8", dated Oct. 18, 2013, 17 Pages.
Yu, et al., "Some Sample Programs Written in DryadLINQ", Available at: ftp://ftp.research.microsoft.com/pub/tr/TR-2008-74.p, May 11, 2008, 37 Pages.
"Fourth Office Action Issued in Chinese Patent Application No. 201110314213.8", dated Apr. 14, 2015, 12 Pages.
"Notice of Re-examination Issued in Chinese Patent Application No. 201110314213.8", dated Nov. 20, 2015, 12 Pages.
"Second Office Action Issued in Chinese Patent Application No. 201110314213.8", dated Jun. 4, 2014, 13 Pages.

(56) References Cited

OTHER PUBLICATIONS

"Third Office Action Issued in Chinese Patent Application No. 201110314213.8", dated Sep. 25, 2014, 13 Pages.
"Notice of Allowance Issued in Japanese Patent Application No. 2013-532828", dated Aug. 18, 2016, 3 Pages.
"Office Action Issued in Japanese Patent Application No. 2013-532828", dated Nov. 9, 2015, 5 Pages.
"Office Action Issued in Japanese Patent Application No. 2013-532828", dated May 12, 2016, 5 Pages.
Assenmacher, et al., "PANDA—Supporting Distributed Programming in C++", In Proceedings of the 7th European Conference on Object-Oriented Programming, Jun. 26, 1993, 23 Pages.
Blochinger, et al., "The Design of an API for Strict Multithreading in C++", In 9th International Euro-Par Conference of Parallel Processing, 2003, 10 Pages.
Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, 14 Pages.
Chen, et al., "An Efficient Method for Expressing Active Object in C++", In ACM SIGSOFT Software Engineering Notes, vol. 25, Issue 3, May 2000, pp. 32-35.
Czarnecki, et al., "DSL Implementation in MetaOCaml, Template Haskell, and C++", In Domain-Specific Program Generation, 2004, pp. 51-72.
Dean, et al., "MapReduce: Simplified Data Processing on Large Clusters", In Magazine Communications of the ACM—50th Anniversary, vol. 51, Issue 1, Jan. 1, 2008, 13 Pages.
Dotsenko, et al., "A Multi-platform Co-Array Fortran Compiler", In Proceedings of the 13th International Conference on Parallel Architectures and Compilation Techniques, Sep. 29, 2004, 12 Pages.
Falcou, et al., "QUAFF: Efficient C++ Design for Parallel Skeletons", In Journal of Parallel Computing, vol. 32, Issue 7, 2006, 12 Pages.
Flanagan, Cormac, "Hybrid Type Checking", In Proceedings the 33rd Annual ACM SIGPLAN-SIGACT Symposium on Principles of Programming Languages, vol. 41, Issue 1, Jan. 2006, 16 Pages.
Gasper, et al., "Automatic Parallelization of Sequential C Code", In Midwest Instruction and Computing Symposium, 2003, 11 Pages.
Gillick, et al., "MapReduce: Distributed Computing for Machine Learning", Retrieved From <<https://pdfs.semanticscholar.org/20b8/77e96201a08332b5dcd4e73a1a30c9ac5a9e.pdf>>, Dec. 18, 2006, 12 Pages.
Groff, Dana, "Lighting up Windows Server 2008 R2 Using the ConcRT on UMS", Retrieved From <<http://www.microsoftpdc.com/2009/SVR10>>, Jul. 16, 2010, 2 Pages.
Gunal, Atilla, "Resource Management in Concurrency Runtime—Part 2", Retrieved From <<https://blogs.msdn.microsoft.com/nativeconcurrency/2009/07/21/resource-management-in-concurrency-runtime-part-2/>>, Jul. 21, 2009, 2 Pages.
Hofstedt, et al., "TURTLE++—A CIP-Library for C++", In Proceedings of the International Conference on Applications of Declarative Programming and Knowledge Management, Oct. 22, 2005, 13 Pages.
Isard, et al., "Distributed Data-Parallel Computing Using a High-Level Programming Language", In Proceedings of the 35th SIGMOD International Conference on Management of Data, Jun. 29, 2009, 8 Pages.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 Pages.
Kerr, Kenny, "C++: The Most Powerful Language for .NET Framework Programming", Retrieved From <<https://msdn.microsoft.com/en-us/library/ms379617(v=vs.80).aspx>>, Jul. 2004, 21 Pages.
Paulson, Lawrence, "A Semantics-Directed Compiler Generator", In Proceedings of the 9th ACM SIGPLAN-SIGACT Symposium on Principles of Programming Languages, Jan. 25, 1982, pp. 224-233.

"International Preliminary Report on Patentability Issued in PCT Application No. PCT/US2011/053006", dated Apr. 18, 2013, 7 Pages.
"International Search Report and Written Opinion Issued in PCT Application No. PCT/US2011/053006", dated Mar. 20, 2012, 10 Pages.
Penry, et al., "Exposing Parallelism and Locality in a Runtime Parallel Optimization Framework", In Proceedings of the 7th ACM international conference on Computing frontiers, May 17, 2010, 2 Pages.
Polychronopoulos, Constantine D., "The Hierarchical Task Graph and Its Use in Auto-Scheduling", In Proceedings of the 5th International Conference on Supercomputing, Jun. 1, 1991, pp. 252-263.
Rauchwerger, Lawrence, "Run-Time Parallelization: It's Time Has Come", In the Special Issue on Languages & Compilers for Parallel Computers, May 31, 1998, 25 Pages.
Saltz, et al., "Run-Time Parallelization and Scheduling of Loops", In NASA Contractor Report-181763, ICASE Report No.-88-70, Dec. 1988, 35 Pages.
Schneider, et al., "Elastic Scaling of Data Parallel Operators in Stream Processing", In Proceedings of the IEEE International Symposium on Parallel & Distributed Processing, May 23, 2009, 12 Pages.
Sen, Ranjan, "Developing Parallel Programs", In International Journal of Advances in Computer Science, vol. 1, Issue 1, Sep. 2008, 13 Pages.
Sen, Siddhartha, "Dynamic Processor Allocation for Adaptively Parallel Work-Stealing Jobs", In Doctoral Dissertation Submitted to the Department of Electrical Engineering and Computer Science in Partial Fulfillment of the requirements for the Degree of Master of Engineering in Electrical Engineering and Computer Science, Sep. 2004, 82 Pages.
Sobral, et al., "ParC++: A Simple Extension of C++ to Parallel Systems", In Proceedings of the Sixth Euromicro Workshop on, Parallel and Distributed Processing, Jan. 21, 1998, pp. 453-459.
Stichnoth, et al., "Code Composition as an Implementation Language for Compilers", In Proceedings of the Conference on Domain-Specific Languages on Conference on Domain-Specific Languages, Oct. 15, 1997, pp. 119-132.
Striegnitz, et al., "An Expression Template aware Lambda Function", In First Workshop on C++ Template Programming, vol. 10, Oct. 10, 2000, 14 Pages.
Tetierton, James C., "Para Filler: Automatic Runtime Concurrency Configuration for Parallel Scientific Applications", In a Dissertation Submitted to the Graduate Faculty of North Carolina State University in Partial Fulfillment of the Requirements for the Degree of Master of Science, 2007, 50 Pages.
Tran, et al., "Parallel Programming with Data Driven Model", In Proceedings of 8th Euromicro Workshop on Parallel and Distributed Processing, Jan. 1, 2000, 7 Pages.
Vasconcelos, et al., "Typechecking a Multithreaded Functional Language with Session Types", In Theoretical Computer Science, vol. 368, Issue 1-2, Dec. 2006, pp. 1-39.
Veldhuizen, Todd L., "C++ Templates as Partial Evaluation", In Cornell University Library, Oct. 9, 1998, 13 Pages.
Wang, et al., "XCLONER: An Interactive Multiplalform Parallel Image Processing Development Environment", In VLSI Signal Processing, Oct. 28, 1992, 9 Pages.
Wyk, Christopher J.Van., "Arithmetic Equality Constraints as C++ Statements", In Software-Practice and Experience, vol. 22, Issue 6, Jun. 1, 1992, pp. 467-494.
Yu, et al., "Distributed Aggregation for Data-Parallel Computing: Interfaces and Implementations", In Proceedings of the ACM SIGOPS 22nd Symposium on Operating Systems Principles, Oct. 11, 2009, 17 Pages.
"Non Final Office Action Issued in U.S. Appl. No. 15/465,590", dated Jan. 18, 2019, 24 Pages.
"Non Final Office Action Issued in U.S. Appl. No. 15/465,547", dated Jan. 10, 2019, 16 Pages.
Izakian, et al., "Comparison of Heuristics for Scheduling Independent Tasks on Heterogeneous Distributed Environments", In Proceedings of International Joint Conference on Computational Sciences and Optimization, Apr. 24, 2009, 5 Pages.

(56) References Cited

OTHER PUBLICATIONS

"Final Office Action Issued in U.S. Appl. No. 15/465,547", dated May 31, 2019, 6 Pages.
"Final Office Action Issued in U.S. Appl. No. 15/465,590", dated May 31, 2019, 5 Pages.
"Office Action Issued in European Patent Application No. 11831225.5", dated Aug. 28, 2019, 8 Pages.
Chen, et al., "Adaptive Multi-versioning for OpenMP Parallelization via Machine Learning", In Proceedings of the 15th International Conference on Parallel and Distributed Systems, Dec. 8, 2009, pp. 907-912.
Subhlok, et al., "Exploiting Task and Data Parallelism on a Multicomputer", In Proceedings of the fourth ACM SIGPLAN Symposium on Principles and Practice of Parallel Programming, May 19, 1993, pp. 13-22.

\* cited by examiner

```
int main(int argc, char * argv[])
{
    Dag * dag = CreateDag(argc, argv);  }404 auto reader = continue_when(dag->Begin(), []() -> std::vector<int>
    {
        // Create the input vector
        std::vector<int> v;
        for (int i = 0; i < N; i++) v.push_back(N-i);
        return v;
    });                  428                                430 auto sort1 = continue_when(reader, [](const std::vector<int>& data)
    -> std::vector<int>
                      432
    {
        // Sort the first half
        std::vector<int> v(data.begin(), (data.begin() + data.size()/2));
        std::sort(v.begin(), v.end());
        return v;
    });

auto sort2 = continue_when(reader, [](const std::vector<int>& data)
    -> std::vector<int>
    {
        // Sort the second half
        std::vector<int> v((data.begin() + data.size()/2), data.end());
        std::sort(v.begin(), v.end());
        return v;
    });

continue_when(sort1, sort2, [](const vector<int>& v1,
    const vector<int>& v2)-> vector<int>
    {
        // Merge the two sorted vectors
        std::vector<int> v;
        std::merge(v1.begin(), v1.end(), v2.begin(), v2.end(), v.begin());
        return v;
    });

// Execute the DAG  } 414
    dag->Run();

DestroyDag(dag);  }416
    return 0;
}
```

406

408

410

412

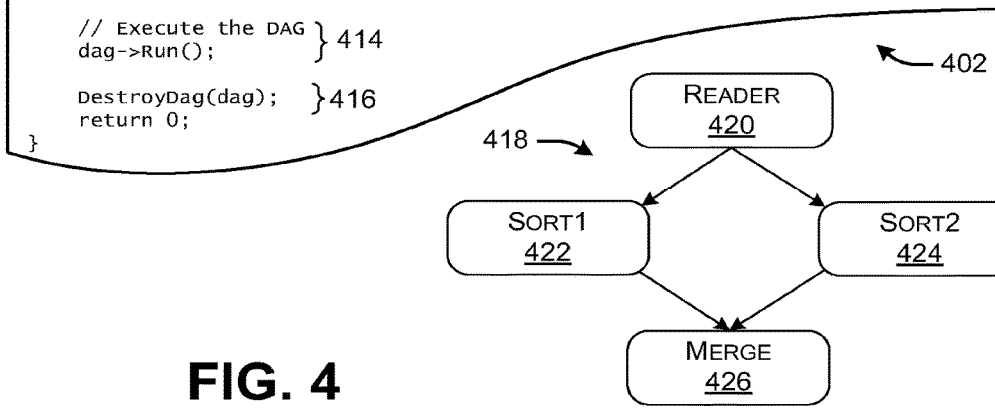

FIG. 4

VERIFICATION OF A DATAFLOW REPRESENTATION OF A PROGRAM THROUGH STATIC TYPE-CHECKING

CROSS-REFERENCE TO RELATED APPLICATIONS

This patent application is a continuation of Ser. No. 12/954,915 filed Nov. 29, 2010, entitled "VERIFICATION OF A DATAFLOW REPRESENTATION OF A PROGRAM THROUGH STATIC TYPE-CHECKING," which is incorporated herein by reference.

BACKGROUND

Technology exists for partitioning a program into components and distributing those components to the computing resources of an execution environment. For example, the execution environment may include a collection of processing cores associated with a single computing device, or a collection of servers associated with a computing cluster, and so on. The computing resources that are invoked can then execute the components in distributed and parallel fashion. This technology may expedite the execution of the user program, especially in those scenarios in which the program involves the processing of a large amount of data.

However, the above-described execution approach complicates the execution of a program. This added complexity, in turn, may lead to errors in the execution of the program which are difficult to identify and fix. Among other possible negative consequences, such runtime errors are "expensive" because they waste computer resources; further, the errors may require substantial debugging effort to correct.

SUMMARY

Functionality is described for providing a compiled program that can be executed in a parallel and a distributed manner by a selected runtime environment. The functionality includes a compiler module for producing the compiled program based on a dataflow representation of a user program (referred to herein as a "dataflow-expressed program" for brevity). The dataflow-expressed program, in turn, includes a plurality of tasks that are connected together in a manner specified by a graph (such as a directed acyclic graph). Each task has at least one input associated with a specified type and an output associated with a specified type. As part of its processing, the compiler module operates by performing static type-checking on the dataflow-expressed program to identify the presence of any mismatch errors in the dataflow-expressed program. By virtue of this approach, the above-described functionality can identify any mismatch errors in constructing the graph prior to its instantiation and execution in a runtime environment, thereby reducing or eliminating the occurrence of the above-described types of expensive runtime failures.

According to one illustrative aspect, the static type-checking can involve, for each task, determining whether a type associated with each input matches an expected input type. The static type-checking can also involve determining whether a number of inputs matches an expected number of inputs.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows an example of a dataflow-expressed program.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for producing a compiled program that can be executed in a parallel and a distributed manner by a runtime environment, where that runtime environment is selected from a plurality of candidate runtime environments. The process for producing the compiled program involves performing static type-checking to verify that tasks specified in the program are connected together in a permitted manner. Section B describes one illustrative manner of operation of the functionality of Section A in flowchart form. Section C describes illustrative processing functionality that can be used to implement any aspect of the features described in Sections A and B.

The subject matter described herein is related to the following copending applications: a) application Ser. No. 12/900,705, entitled "RUNTIME AGNOSTIC REPRESENTATION OF USER CODE FOR EXECUTION WITH SELECTED EXECUTION RUNTIME"; b) application Ser. No. 12/900,696, entitled "DYNAMIC DATA AND COMPUTE RESOURCE ELASTICITY"; and c) application Ser.

No. 12/900,708, entitled "DECLARATIVE PROGRAMMING MODEL WITH A NATIVE PROGRAMMING LANGUAGE." All three applications name the inventors of Krishnan Varadarajan and Michael L. Chu, and all three applications were filed on Oct. 8, 2010. All three applications are incorporated by reference herein in their respective entireties.

Figure 12:
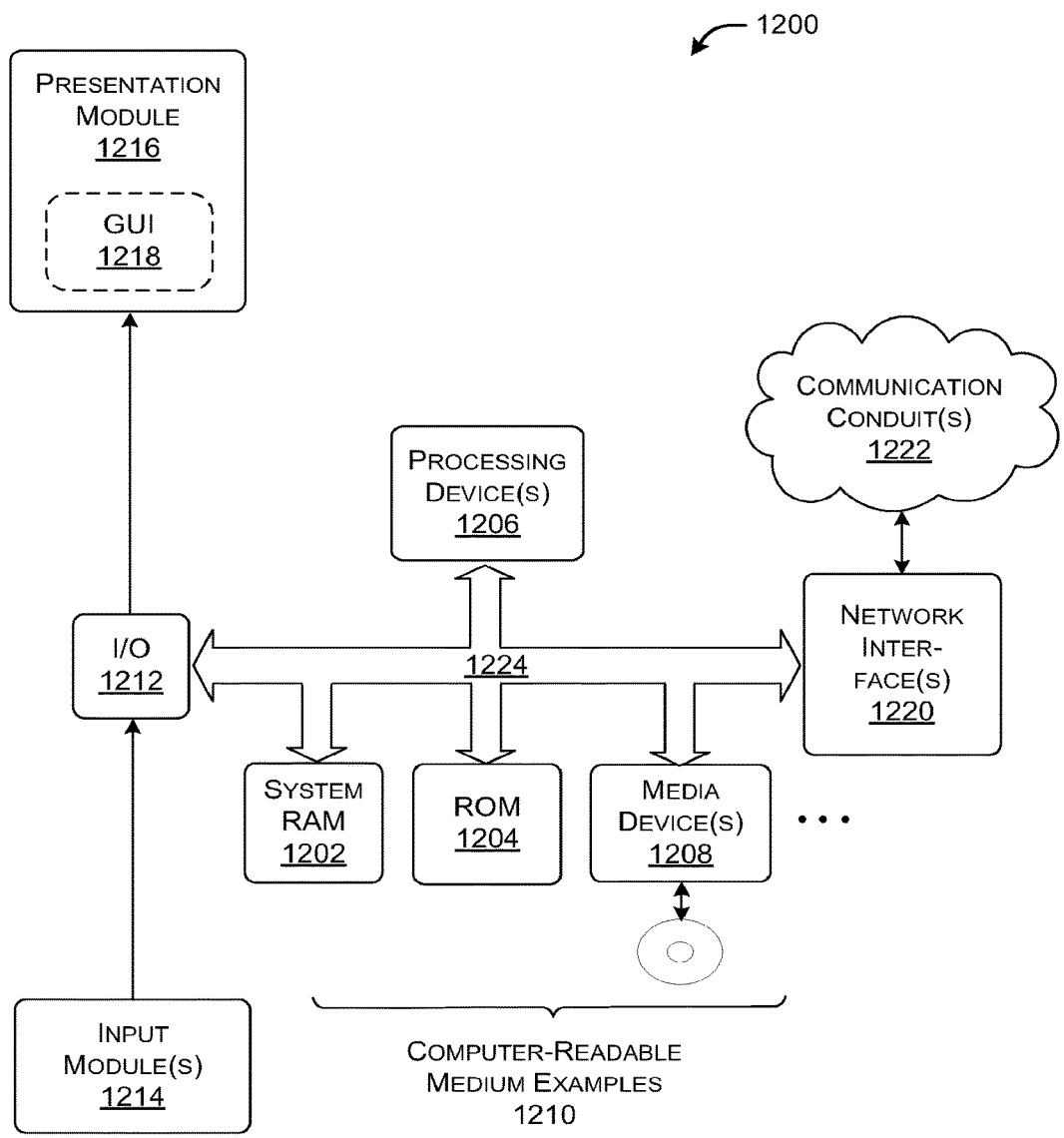
FIG. 12 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Functionality

Figure 1:
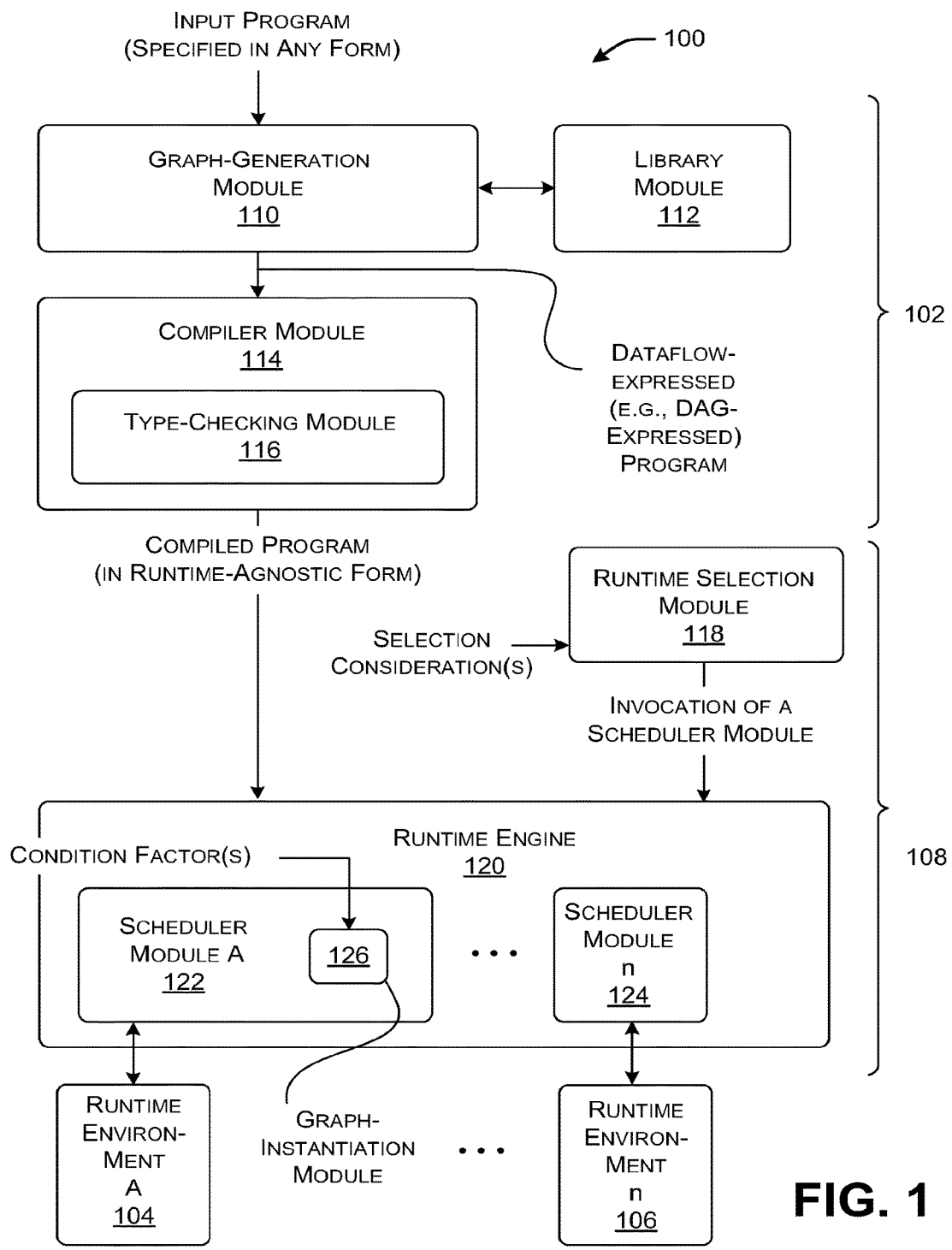
FIG. 1 shows an illustrative environment for compiling a user program to produce a compiled program, and for executing the compiled program in a potentially parallel and distributed manner

FIG. 1 shows an environment 100 which represents one implementation of the features described herein. The environment 100 can be conceptualized as including two domains of functionality, compilation functionality and runtime functionality. Namely, compilation functionality 102 is used to provide a compiled program. That compiled program is expressed in an agnostic form that can be executed on any runtime environment selected from among a plurality of candidate runtime environments (104, . . . 106). Each runtime environment, in turn, can provide a plurality of computing resources for implementing the compiled program in a parallel and distributed manner. The environment 100 also includes runtime functionality 108 for executing the compiled program in the context of the selected runtime environment.

The compilation functionality 102 can be implemented in any manner. For example, the compilation functionality 102 can be implemented by one or more computing devices of any type, such as one or more personal computers, one or more computer workstations, etc. The runtime functionality 108 can likewise be implemented in any manner, such as by one or more computing devices of any type. In one case, the compilation functionality 102 is separate and distinct from the runtime functionality 108. In another case, there is at least a partial overlap between the equipment used to implement the compilation functionality 102 and the equipment used to implement runtime functionality 108.

This section describes the operation of the environment 100 of FIG. 1, generally from top to bottom, with emphasis (in Subsection A.2) on static-type checking performed by the compilation functionality 102. At the outset, it is pointed out that the environment 100 shown in FIG. 1 is just one system-related context in which static type-checking of dataflow-expressed programs can be performed. The static type-checking can also be performed in other system-related contexts that may differ from the environment 100 shown in FIG. 1 in any manner.

A.1. Overview of the Environment

The compilation functionality 102 can include, or can be conceptualized to include, a graph-generation module 110. The graph-generation module 110 receives an input program that is expressed in any original form. The graph-generation module 110 then converts the input program into a program that is represented in terms of a dataflow of tasks (if in fact, the input program is not already expressed in this format). In the terminology used herein, the graph-generation module 110 is said to generate a dataflow-expressed program. To provide this service, the graph-generation module 110 can rely on resources provided by a library module 112. For example, the library module 112 can provide application programming interface (API) modules that can be referenced by the dataflow-expressed program. The below-explanation provides additional details regarding the operation of the graph-generation module 110 and the construction of an illustrative dataflow-expressed program.

A compiler module 114 then converts the dataflow-expressed program into a compiled program, e.g., by converting the instructions in the dataflow-expressed program into a binary form that is executable by one of the runtime environments (104, . . . 106). The compiler module 114 also includes a type-checking module 116. From a high-level standpoint, the type-checking module 116 examines tasks identified in the dataflow-expressed program. The type-checking module 116 ensures that the tasks are connected together in an appropriate manner so that the compiled program will not produce runtime errors when it is executed. Subsection A.2 provides additional illustrative details regarding the operation of the type-checking module 116.

Now referring to the runtime functionality 108, a runtime selection module 118 can optional receive information with respect to one or more selection considerations. Based thereon, the runtime selection module 118 can choose a runtime environment that is deemed appropriate to execute the compiled program. For example, the selection considerations can include any of: a) information regarding the characteristics of the compiled program; b) information regarding an amount of data that is to be processed by the compiled program; c) information regarding the amounts (and kinds) of computing resources that are available to run the compiled program; d) information regarding the express processing instructions identified by a user (or other agent), and so on.

A runtime engine 120 includes a plurality of scheduler modules (e.g., 122, . . . 124) that can be used to execute the compiled program in respective runtime environments. For example, scheduler module A 122 can be invoked to control the execution of the compiled program in runtime environment A 104. Scheduler module n 124 can be invoked to control the execution of the compiled program in runtime environment n 106, and so on.

Each scheduler module can include a graph instantiation module, such as graph instantiation module 126 used by scheduler module A 122. The scheduler module A 122 calls on the graph instantiation module 126 when it is ready to execute a particular work item (e.g., a particular task) specified in the compiled program. In response, the graph instantiation module 126 receives and evaluates information regarding one or more condition factors. Based thereon, the graph instantiation module 126 determines an appropriate instantiation of the work item. The condition factors can correspond to any of the information items identified above (with respect to the selection factors), such as information regarding the amount of data that is expected to be processed by the work item, information regarding the amounts and kinds of available computing resources, and so on. Again, the explanation below provides additional illustrative details regarding the operation of any scheduler module.

Figure 2:
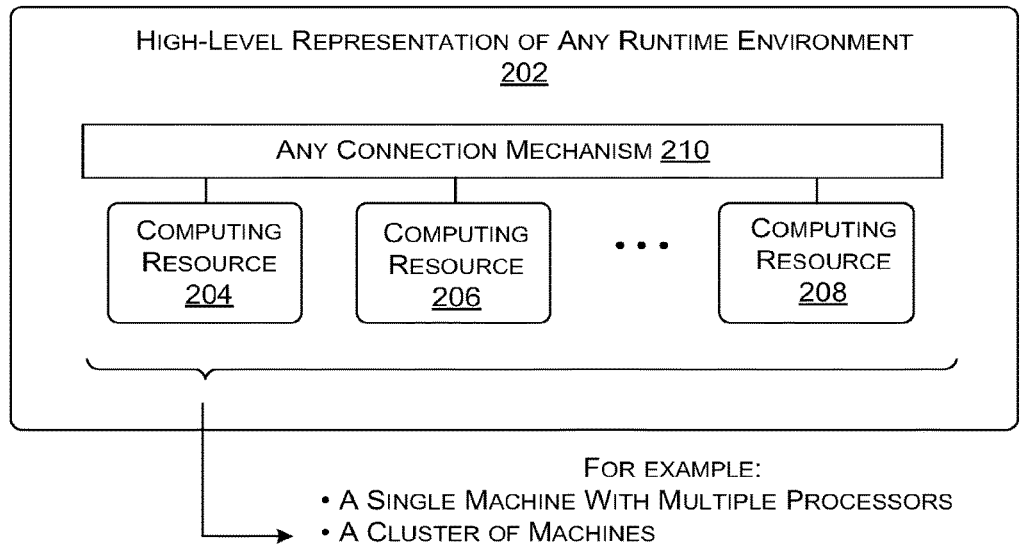
FIG. 2 shows a high-level representation of an execution environment that can be used to execute a compiled program.

Advancing to FIG. 2, this figure shows a high-level representation of any runtime environment 202. Generally stated, the runtime environment 202 includes a plurality of computing resources (204, 206, . . . 208). The computing resources (204, 206, . . . 208) can refer to any combination of processing resources, storage resources, bandwidth-related resources, and so on. The computing resources (204, 206, . . . 208) can be coupled together in any manner, e.g., via point-to-point connections, via a local area network, via a wide area network (e.g., the Internet), via a peer-to-peer network, and so on. Connection mechanism 210 generally represents any such means of connecting the computing resources (204, 206, . . . 208) together.

For example, in one scenario, the runtime environment 202 corresponds to a single computing machine. In that context, the plural computing resources (204, 206, . . . 208) can correspond to plural central processing cores (e.g., plural CPUs), plural graphics processing units (GPUs), etc. In a second scenario, the runtime environment 202 corresponds to a cluster of computing machines. Here, the plural computing resources (204, 206, . . . 208) correspond to the plural computing machines and/or other processing resources, which can be located at the same site or distributed over plural sites. In a third scenario, the runtime environment 202 corresponds to a more encompassing cloud of computing machines. Here, the plural computing resources (204, 206, . . . 208) correspond to the plural computing machines and/or other processing resources, which can be located at the same site or distributed over plural sites. These scenarios are representative rather than exhaustive; that is, the principles described herein can be implemented in the context of other runtime environments.

Figure 3:
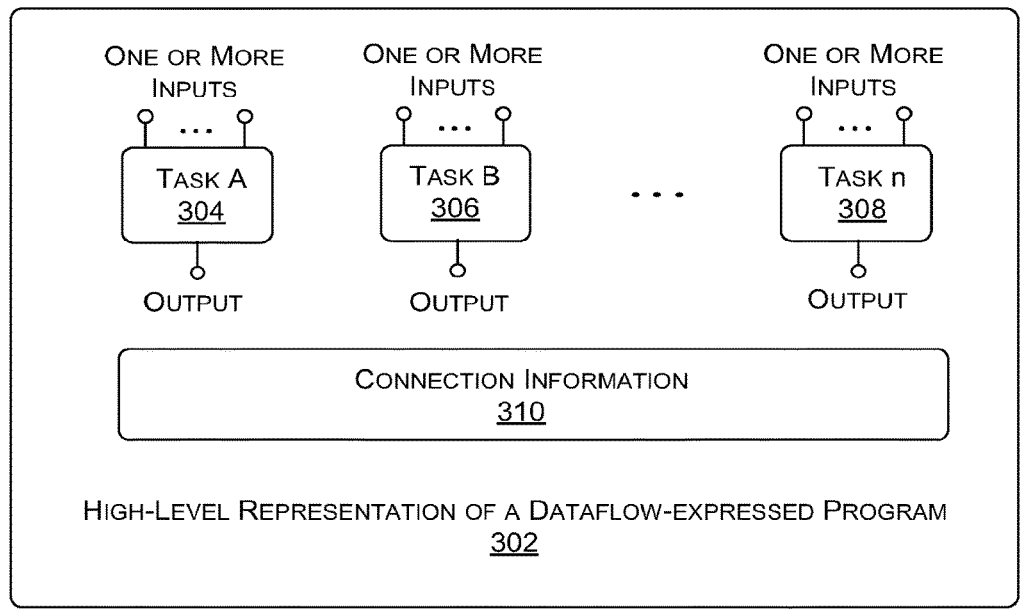
FIG. 3 shows a high-level representation of a dataflow-expressed program that includes a plurality of tasks.

FIG. 3 shows a high-level representation of a dataflow-expressed program 302. In one example, the dataflow-expressed program 302 can specify one or more tasks (304, 306, . . . 308) that perform respective functions. Each task can receive one or more inputs, perform some function on the input(s), and then generate an output that reflects the outcome of its processing. The dataflow-expressed program 302 can also include connection information 310 which expresses the connection among the tasks. The output of any task can be fed as input to one or more other tasks. The connection of the tasks (304, 306, . . . 308), as defined by the connection information 310, defines a graph, such a directed acyclic graph (DAG).

In one implementation, the tasks (304, 306, . . . 308) are side-effect free. Further, the tasks (304, 306, . . . 308) do not share data. This means that the tasks (304, 306, . . . 308) are self-contained units. And as such, the processing of one task does not affect the processing of another task, except insofar as the outcome of some tasks may feed into other tasks as input. In addition, the environment 100 as a whole is configured to accommodate the lazy execution of the tasks (304, 306, . . . 308). This means that the runtime environment can execute the tasks when (and if) there is a demand to execute the tasks, and not before.

The dataflow-expressed program 302 as a whole can perform any function, and can be expressed in any programming language. For example, the dataflow-expressed program 302 can represent a high-level application that performs any function, a component of an operating system, and so on.

FIG. 4 shows an example of one particular dataflow-expressed program 402. From a high-level perspective, the dataflow-expressed program is structured as follows. First, the dataflow-expressed program 402 includes an instruction 404 to invoke an appropriate scheduler module to execute a graph defined by the dataflow-expressed program 402. In the context of FIG. 1, the runtime selection module 118 represents the functionality which carries out the instruction 404. The dataflow-expressed program also includes task objects (e.g., task objects 406, 408, 410, and 412) which define respective tasks. The dataflow-expressed program 402 populates the nodes in the graph based on the task objects. The dataflow-expressed program 402 also includes an instruction 414 that invokes the execution of the tasks in the graph. Finally, the dataflow-expressed program 402 can include an instruction 416 to delete the graph once the dataflow-expressed program 402 has been executed. To repeat, the dataflow-expressed program 402 is one way among many to formulate a dataflow-type program.

FIG. 4 also shows a graphical representation 418 of the graph defined by the dataflow-expressed program 402. The vertices (nodes) in the graph represent actions to be performed. The edges that connect the vertices represent the functional coupling among tasks. In other words, the edges represent data that flows among the tasks. In this particular example, the dataflow-expressed program includes a reader node 420 for supplying data to be sorted. The reader node 420 is instantiated based on a reader task object 406. Two sort nodes (e.g., sort node 422 and sort node 424) receive input data from the reader node 420. In response, each sort node performs a sorting function to provide sorted output data. The sort nodes (422, 424) are instantiated based on sort task objects (408, 410). A merge node 426 receives the input data from the two sort nodes (422, 424). In response, the merge node 426 performs a merge function on the input data to generate merged output data. The merge node 426 is instantiated based on a merge task object 412.

In this example, a scheduler associated with a particular runtime environment can execute the tasks associated with each sort node (422, 424) when the appropriate input data is supplied to these nodes (422, 424) by the reader node 420. And the merge node 426 can perform its function when it receives the outputs provided by both sort nodes (422, 424). In this particular example, the scheduler can allocate the tasks associated with each sort node (422, 424) to two different computing resources; the two sort tasks can then be performed in a parallel and distributed fashion.

In one particular implementation, each task object is constructed as a wrapper that encapsulates a function. For example, consider the case of the first sort task object 408. The task object 408 identifies an application programming interface (API) 428, labeled as "continue_when." The library module 112 provides the code for such an API 428

(along with all other APIs). From a functional respective, the act of calling the API 428 establishes the sort node 422 in the graph; that node receives input from the reader node 420 and provides output for consumption by the merge node 426.

The function associated with a task can be expressed in any manner. In one particular example, the dataflow-expressed program 402 can be expressed as a C++ program. In this context, the dataflow-expressed program 402 can express a task's function as a C++ Lambda function, which may contain sequential code Further note that each task object specifies the input(s) associated with each task object, as well as the output associated with each task object. Moreover, each task object specifies the type of each respective input and the type of the output. For example, consider the first sort task object 408. In code element 430, this task object 408 specifies that the task receives a single input having a type "std:vector<int>" (for a vector of integers). In code element 432, this task object 408 also specifies that the task provides a single output having a type "std:vector<int>." Generally, in a typed system, the type of a data item specifies the manner in which the data item is to be interpreted by a computer system. Due to the type information provided by each task object in FIG. 2, the task objects can be said to be strongly typed. As will be set forth in Subsection A.2, the type-checking module 116 can leverage type information specified for each task object to ensure that the tasks are connected together in an appropriate manner.

In one implementation, the graph-generation module 110 (of FIG. 1) can provide an original input program in a form that already embodies the type of graph content shown in FIG. 4. In this case, the graph-generation module 110 produces the dataflow-expressed program by appropriately integrating the user program with the API (and/or other) resources provided in the library module 112.

In another implementation, the graph-generation module 110 can provide an original input program in some other form that may not fully embody the type of graph content shown in FIG. 4. In this case, the graph-generation module 110 can translate the original input program into the form specified in FIG. 4 (or into another appropriate dataflow form). For example, in one scenario, the graph-generation module 110 can receive an input program expressed in a declarative query syntax, such as the query syntax expressed in copending application Ser. No. 12/900,708, entitled "DECLARATIVE PROGRAMMING MODEL WITH A NATIVE PROGRAMMING LANGUAGE." The queries in that case are not integrated with the underlying native programming language, but rather may be expressed using a method-based invocation strategy. The graph-generation module 110 can then map or translate the query syntax into the form specified in FIG. 4 (or into another appropriate data flow form).

Figure 5:
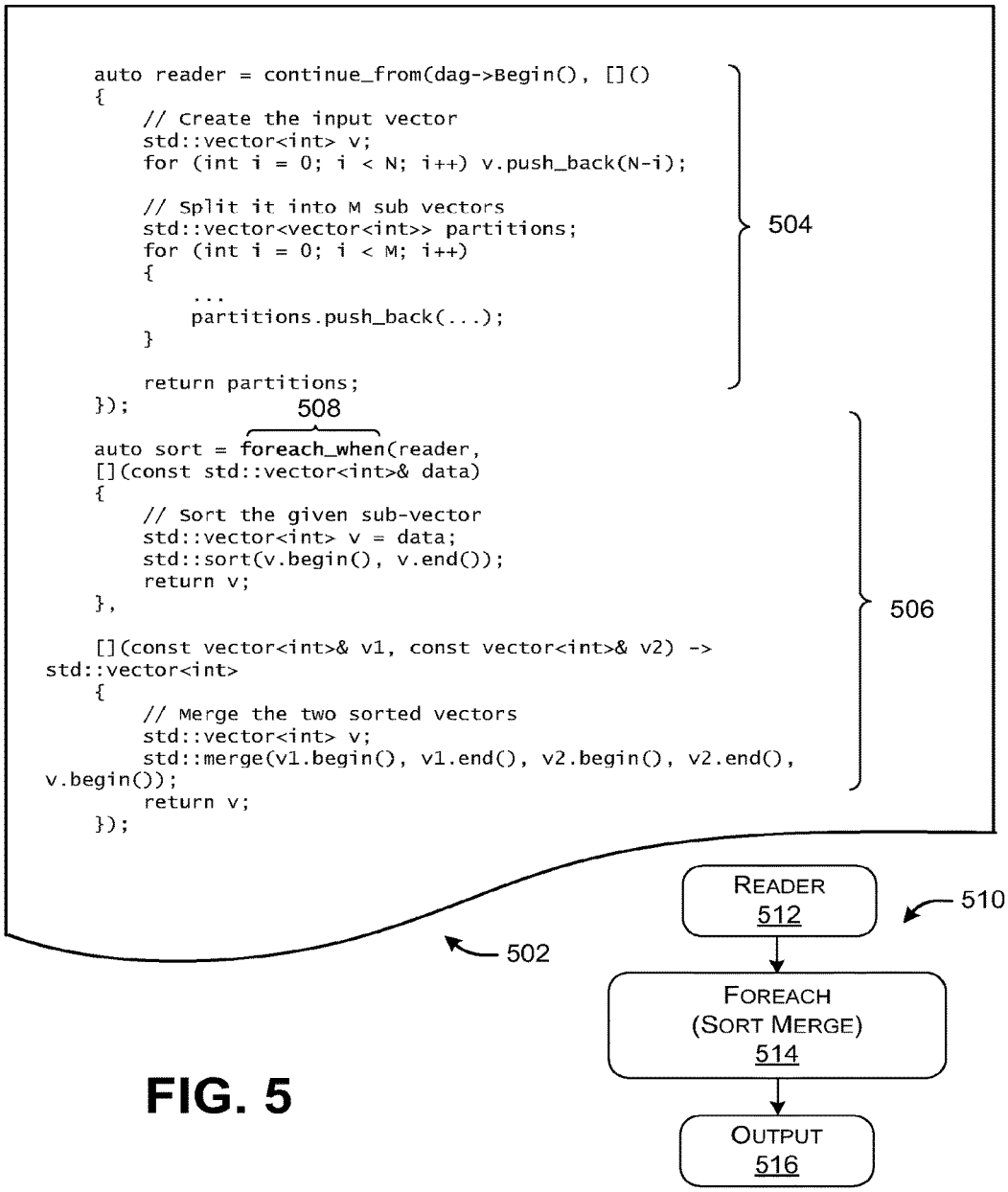
FIG. 5 shows another example of a dataflow-expressed program. This dataflow-expressed program accommodates elastic instantiation of the tasks specified therein during the execution of the program.

FIG. 5 shows another example of a dataflow-expressed program 502. This dataflow-expressed program 502 performs the same functions as the dataflow-expressed program 402 of FIG. 4. But the dataflow-expressed program 502 of FIG. 5 is constructed in a different manner to more efficiently take advantage of dynamically-changing resources provided in a runtime environment.

More specifically, the dataflow-expressed program 502 includes a reader task object 504 that performs a reader function; in this case, the reader function also generates data partitions in an appropriate manner. The dataflow-expressed program 502 also includes a sort-merge task object 506 that performs a sorting and merging operation with respect to a particular data partition. The sort-merge task object 506 is implemented using an API 508 labeled "foreach_when." FIG. 5 also shows a graphical representation 510 of the tasks specified in the dataflow-expressed program 502. Namely, the graph includes a reader node 512 for performing a reader function, a sort-merge node 514 for performing a sorting and merging operation, and an output node 516 for outputting a final result provided by a final merge operation.

In the examples above, the dataflow-expressed program represents a generic program that can be implemented by any runtime environment selected from a plurality of possible candidate runtime environments. In other words, the dataflow-expressed program is not particularly constructed to accommodate the features found in any particular runtime environment, and can therefore be said to be agnostic with respect to the features provided by the available runtime environments. This characteristic provides good user experience, as a user can generate a single user program without taking into consideration the particular strengths and constraints of a target runtime environment. Furthermore, this characteristic expands the applicability of any program developed by the user.

Figure 6:
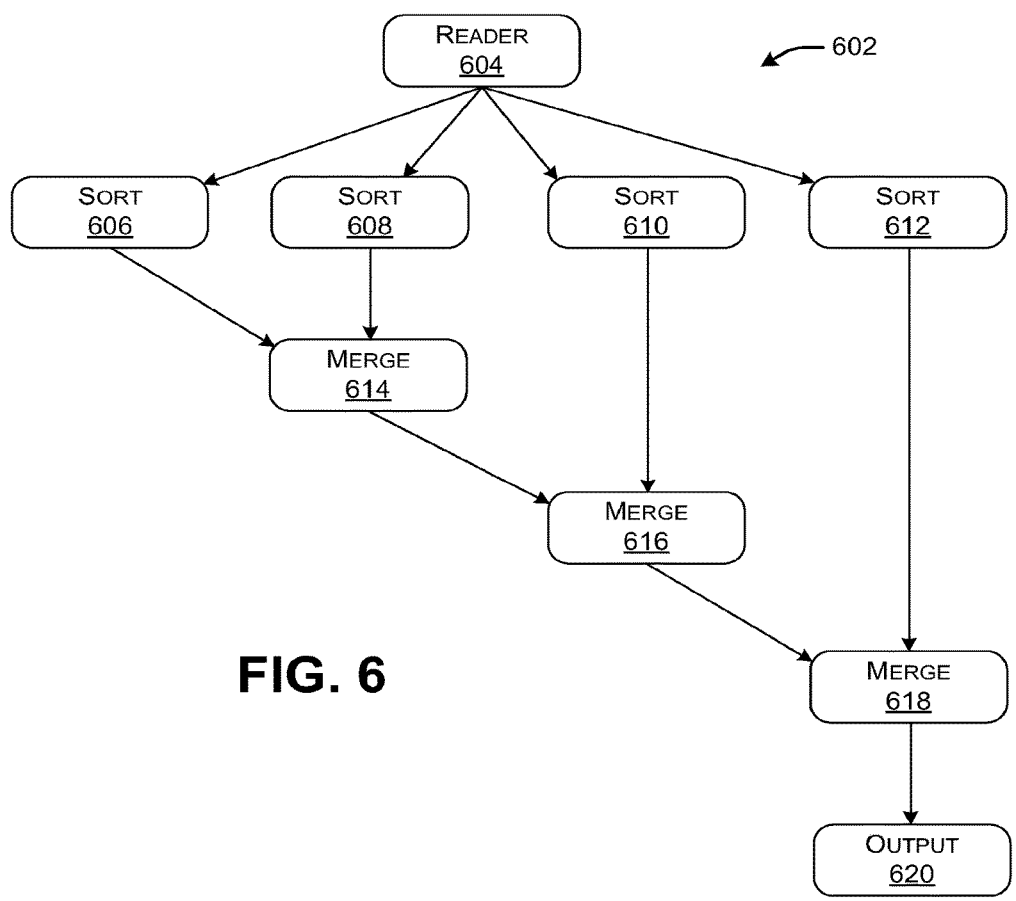
FIG. 6 shows one particular runtime instantiation of the dataflow-expressed program of FIG. 5.

FIG. 6 illustrates the manner in which a selected scheduler module can instantiate the general dataflow-expressed program shown in FIG. 5 for a particular runtime environment. As explained above, the scheduler module can determine the manner in which each work item (e.g., each task) is to be instantiated at the time that it is ready to execute the work item (e.g., when all the data for that task has been received). The scheduler module can determine how to instantiate each work item based on the condition factors identified above, including: a) manually-supplied heuristic information; b) information regarding the amount of data that is to be processed by the work item; and c) information regarding the amounts (and kinds) of computing resources that are currently available to handle the work item.

In the merely illustrative case of FIG. 6, a graph instantiation 602 includes a single reader node 604 for implementing the reader task. The scheduler module chooses four sort nodes (606, 608, 610, 612) and three merge nodes (614, 616, 618) for implementing separate instances of the sort-merge task. And the scheduler module chooses a single output node 620 for generates a final output provided by the merge node 618. In this manner, the scheduler module can scale the manner in which the compiled program is executed based on the condition factors identified above.

A.2. Static-Type-Checking Functionality

As explained in Subsection A.1, the compiler module 114 includes a type-checking module 116 that verifies the integrity of the dataflow-expressed program. From a general standpoint, the type-checking module 116 performs checking to statically verify dataflow connections in the graph represented by the dataflow-expressed program. That is, this checking ensures that the nodes of the graph connect together in a permitted manner.

Figure 7:
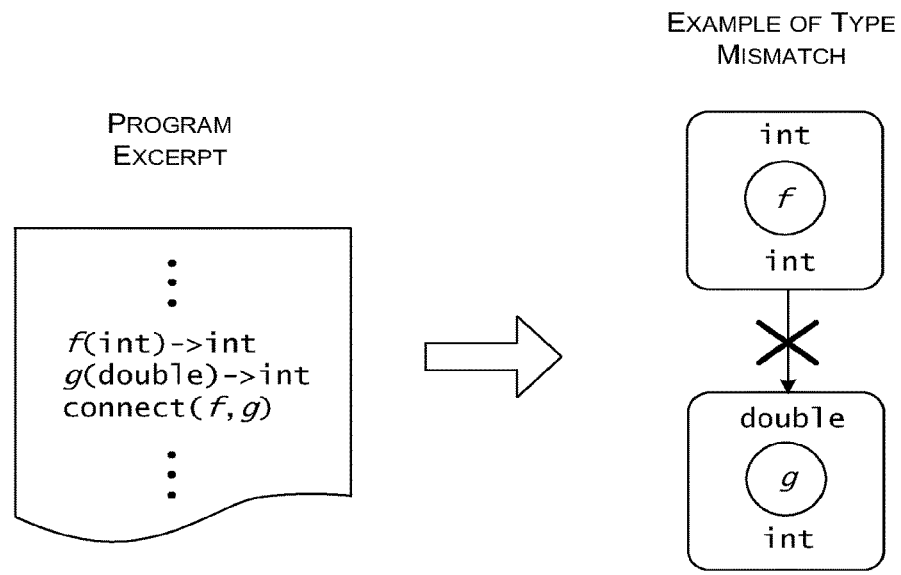
FIGS. 7 and 8 shows examples of static type-checking that can be performed in the course of the compilation of a dataflow-expressed program.
Figure 8:
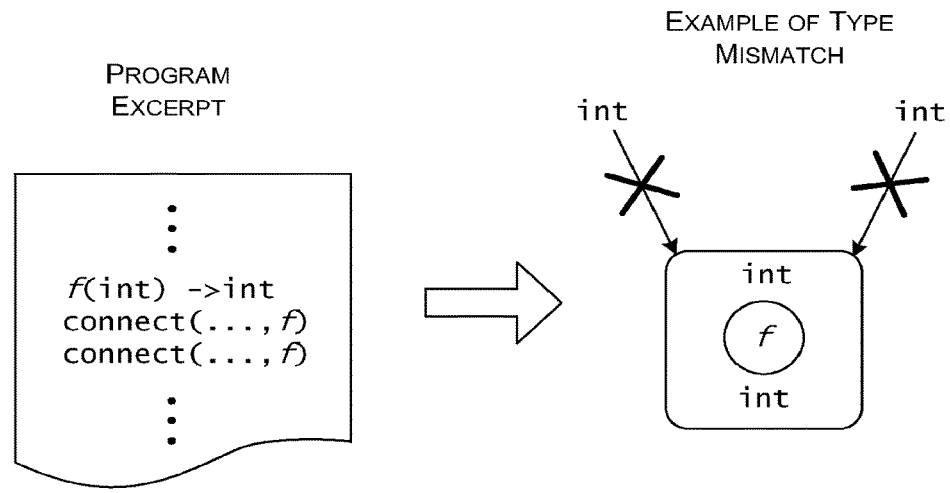

More specifically, the type-checking module 116 can perform at least the kinds of type-checking operations shown in FIGS. 7 and 8. In the example of FIG. 7, assume that, as part thereof, a dataflow-expressed program specifies a first task that performs function $f$ and a second task that performs function g. The function $f$ receives an input of type "int" and supplies an output of type "int." The function g receives an input of type "double" and supplies an output of type "int." The dataflow-expressed program also include appropriate connection information which specifies that the first task is coupled to the second task, such that the first task supplies input data to the second task.

The type-checking module 116 will identify this connection as erroneous. This is because the second task is expecting an input that has the type "double." Yet the first task provides an input of type "int." In other words, there is an incongruity between the type of input expected by the second task and the type of input that is actually supplied to the second task.

In the example of FIG. 8, assume that, as part thereof, a dataflow-expressed program specifies a task f that receives a single input of type "int." The dataflow-expressed program also includes appropriate connection information which specifies that two sources will provide input to the function f Here too, the type-checking module 116 will identify the connection as erroneous. This is because the task is expecting a single input, yet the dataflow-expressed program attempts to provide two inputs to the task. In other words, there is an incongruity between the number of inputs expected by a task and the number of inputs that are actually supplied to the task.

When applied to the example of FIG. 4, the type-checking module 116 can generate a mismatch error if any of the sort tasks do not receive the correct type of data (and/or the correct number of data items) from the reader task. Similarly, the type-checking module 116 can generate a mismatch error if the merge task does not receive the correct type of data (and/or the correct number of data items) from the sort tasks. The scenario of FIG. 4 is a simplified example. In other cases, the dataflow-expressed program can correspond to a larger graph, potentially having graph components created at different times, some of which may be obtained from a library or the like. This will increase the risk that tasks will be connected in an erroneous manner, which the type-checking module 116 can successfully detect.

It is beneficial to detect errors in the compilation stage because the errors may be easier to diagnose and fix at this stage (compared to the runtime stage). Further, it is more resource-efficient (and time-efficient) to identify errors at the compilation stage (compared to the runtime stage). For example, the deployment of a error-prone program in a cluster or cloud environment can potentially waste a significant amount of computing resources.

B. Illustrative Methods

The remaining figures show illustrative procedures and accompanying examples which explain one manner of operation of various features of the environment 100 of FIG. 1. Since one manner of operation of the environment 100 has already been explained in Section A, certain features will be set forth in summary fashion in this section.

Figure 9:
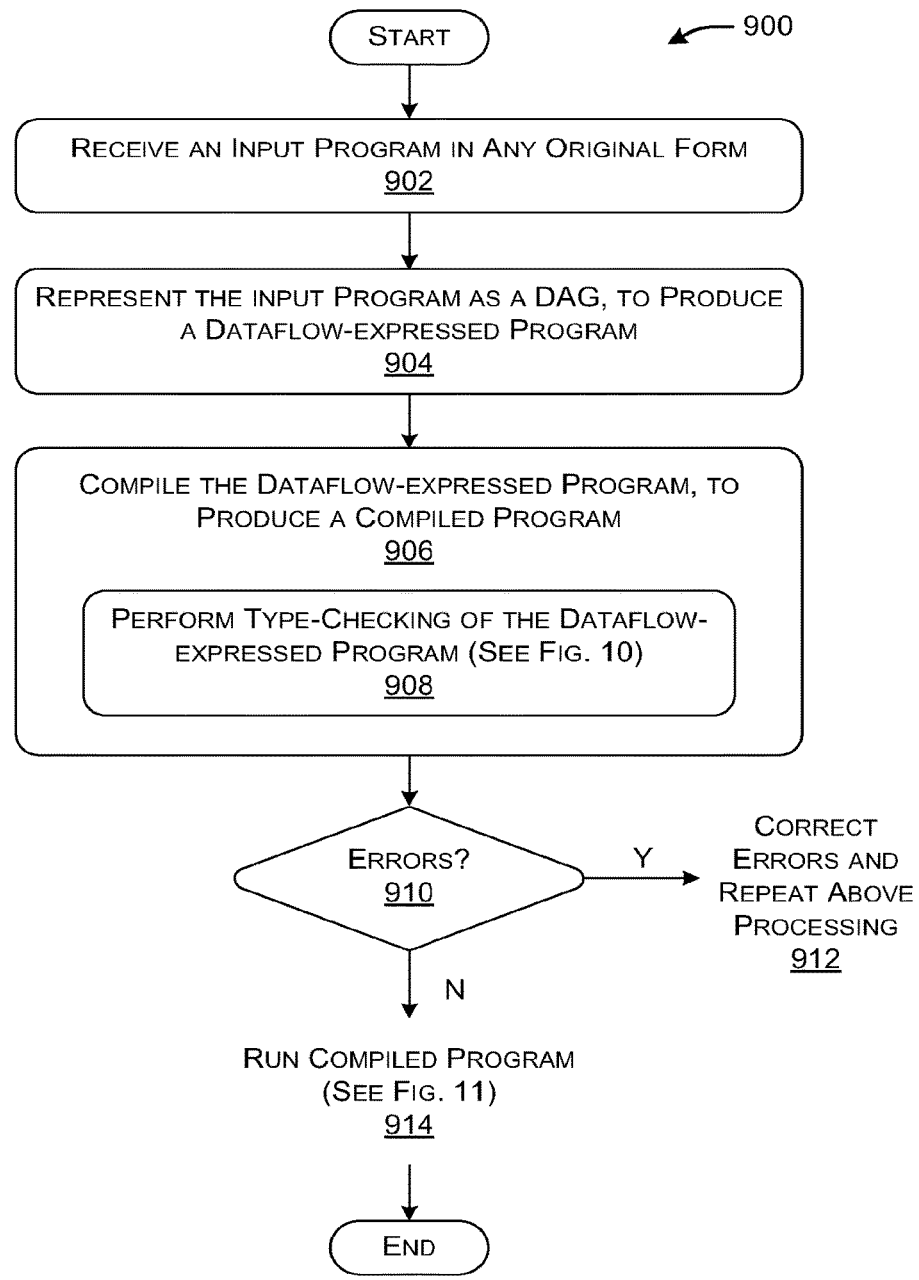
FIG. 9 is a flowchart that describes one illustrative manner for producing a compiled program.

Starting with FIG. 9, this figure shows a procedure 900 that explains one manner of operation of the compilation functionality 102 of FIG. 1. In block 902, the compilation functionality 102 receives an input program expressed in an original form. In block 904, the compilation functionality 102 represents the input program in graph form, e.g., as a dataflow-expressed program. Block 904 can represent different underlying operations depending on the form in which the input program is received. In one case, block 904 can entail translating an input program expressed in a query format to the dataflow form shown in FIG. 4 (or the like).

In block 906, the compilation functionality 102 compiles the dataflow-expressed program to produce a compiled program. The compiled program may represent a binary executable that can be run in a parallel and distributed manner on any runtime environment selected from among plural candidate runtime environments. In this sense, the compiled program can be said to be agnostic with respect to the eventual runtime environment in which the program is executed.

Figure 10:
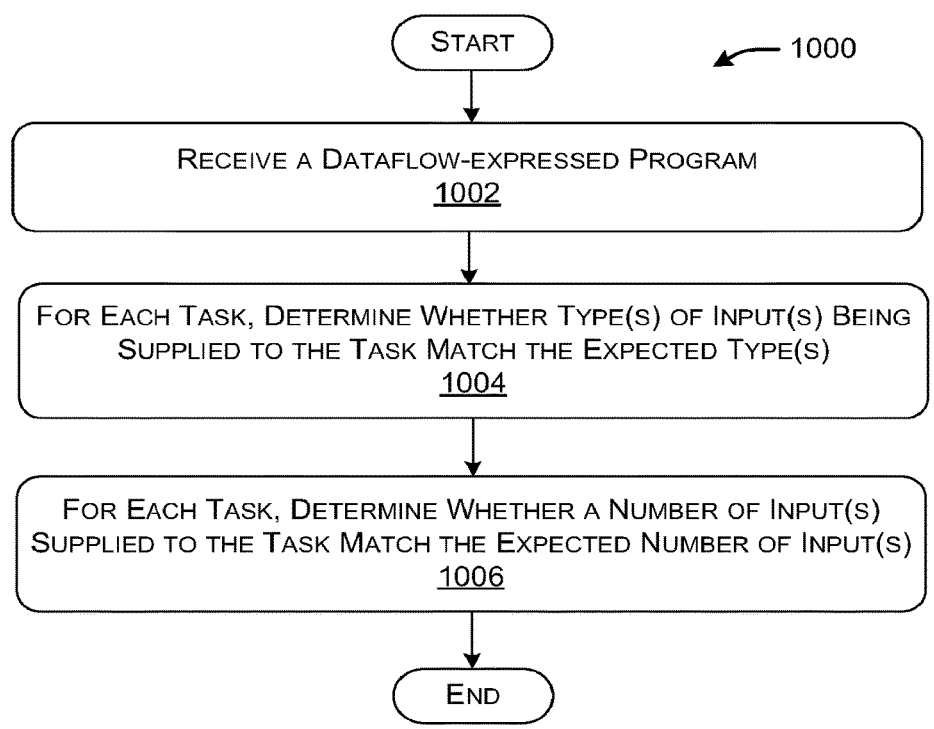
FIG. 10 is a flowchart that describes illustrative static type-checking that can be performed in the course of the procedure of FIG. 9.

As part of the compilation process, in block 908, the compilation functionality 102 can perform static type-checking on the dataflow-expressed program. FIG. 10 provides further details regarding this operation. In block 910, the compilation functionality 102 determines whether any type-checking mismatches have been discovered. If so, in block 912, a user can identify the source of the errors, correct the errors, and then repeat the operations shown in FIG. 9. Alternatively, in block 914, if there are no errors, then the environment 100 can then execute the compiled program.

FIG. 10 shows a procedure 1000 that explains one manner of operation of the type-checking module 116 of FIG. 1. In block 1002, the type-checking module 116 receives a graph-expressed program for analysis. In block 1004, the type-checking module 116 determines, for each task, whether the type(s) of input(s) being supplied to the task match the type(s) of input(s) that are expected. In block 1006, the type-checking module 116 determines, for each task, whether the number of inputs being supplied to the task match the number of inputs that are expected. The type-checking module 116 can perform yet additional types of checking to verify the integrity of the graph that is constructed by the dataflow-expressed program.

Figure 11:
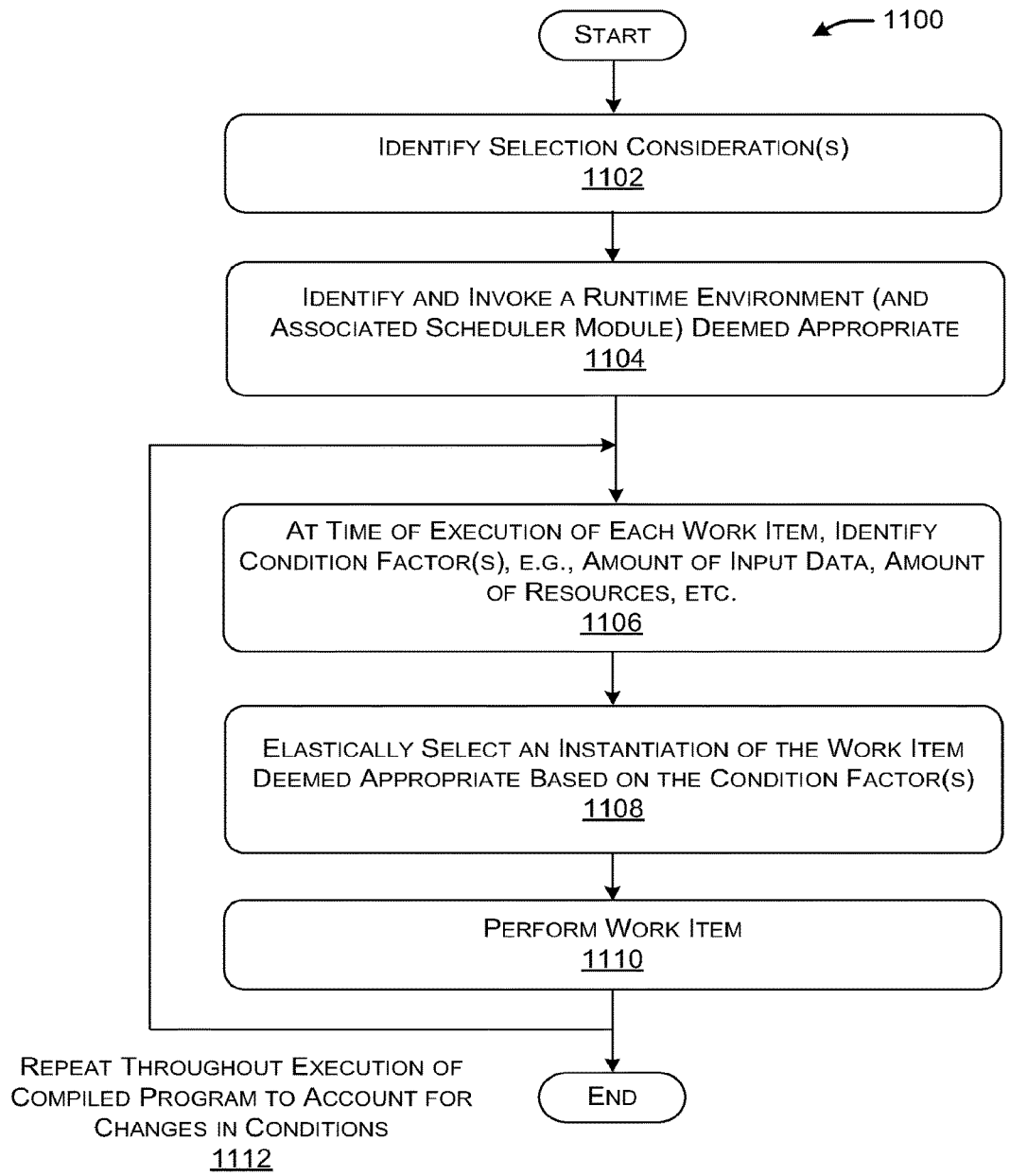
FIG. 11 is a flowchart that describes an illustrative execution of a compiled program produced by the procedure of FIG. 9.

FIG. 11 shows a procedure 1100 that explains one manner of operation of the runtime functionality 108 of FIG. 1. In block 1102, the runtime functionality 108 receives one or more selection considerations that have a bearing on the suitability of different runtime environments to process a particular compiled program. Section A identified illustrative such selection considerations. In block 1104, the runtime functionality 108 selects a runtime environment, based on the selection consideration(s), that is deemed most appropriate to process the compiled program.

In block 1106, a particular scheduler module then begins executing the compiled program, starting with a beginning node of a graph represented by the compiled program. More specifically, in block 1106, for each work item that is ready to be processed (e.g., for each task for which input data has been provided), the scheduler module identifies one or more condition factors that have a bearing on the manner in which the work item is to be instantiated by the associated runtime environment. Section A set forth illustrative such condition factors. In block 1108, the scheduler module elastically selects an instantiation of the work item that is deemed most appropriate to implement the work item. In block 1110, the scheduler module implements the work item using the selected instantiation.

Block 1112 indicates that the operations in blocks 1106, 1108, and 1110 can be repeated throughout the execution of the program, e.g., as different work items become available for execution. The dynamic allocation of work items to computing resources is beneficial because it can account for changing conditions within the runtime environment. For example, the dynamic allocation can account for changes in the amount of input data that is expected. The dynamic allocation can also account for computing resources that become enabled and/or disabled throughout the execution of the compiled program.

C. Representative Processing Functionality

FIG. 12 sets forth illustrative electrical data processing functionality 1200 (also referred to herein a computing functionality) that can be used to implement any aspect of the functions described above. For example, the processing functionality 1200 can be used to implement any aspect of the compilation functionality 102, any aspect of the runtime functionality 108, any aspect of any runtime environment, and so on. In one case, the processing functionality 1200 may correspond to any type of computing device that includes one or more processing devices. In all cases, the electrical data processing functionality 1200 represents one or more physical and tangible processing mechanisms.

The processing functionality 1200 can include volatile and non-volatile memory, such as RAM 1202 and ROM 1204, as well as one or more processing devices 1206 (e.g., one or more CPUs, and/or one or more GPUs, etc.). The processing functionality 1200 also optionally includes various media devices 1208, such as a hard disk module, an optical disk module, and so forth. The processing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible mechanism.

The processing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The processing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network and/or wide area network. The communication conduit(s) 1222 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
memory to store instructions;
a processing device to execute the instructions to:
receive a dataflow-expressed program including a plurality of tasks connected together in a manner specified by a graph, each task having at least one input associated with a specified type and an output associated with a specified type; and
compile the dataflow-expressed program to a compiled parallel program expressed in a parallel form that is executable by any runtime environment selected from a plurality of candidate runtime environments providing a plurality of computing resources for executing the compiled program in a parallel manner, the compiled parallel program agnostic with respect to features provided by the candidate runtime environments, the compile including to static type-check the dataflow-expressed program.

2. The system of claim 1, wherein the dataflow-expressed program expresses the graph as a directed acyclic graph (DAG).

3. The system of claim 2, the static type-check including to statically verify dataflow connections of the DAG.

4. The system of claim 1, wherein each task in the dataflow-expressed program is expressed as an object that specifies each type of each respective input, and a type of the output.

5. The system of claim 1, the static type-check including, for each task, to determine whether a type associated with each input that is supplied to the task matches an expected input type.

6. The system of claim 1, the static type-check including, for each task, to determine whether a number of inputs that are supplied to the task matches an expected number of inputs.

7. The system of claim 1, the static type-check including to identify and correct any mismatch error that is identified.

8. A computer readable storage device, which is not a transitory propagating signal, to store computer-executable instructions to control a computer system to:
receive a dataflow-expressed program including a plurality of tasks connected together in a manner specified by a graph, each task having at least one input associated with a specified type and an output associated with a specified type; and
compile the dataflow-expressed program to a compiled parallel program expressed in a parallel form that is executable by any runtime environment selected from a plurality of candidate runtime environments providing a plurality of computing resources for executing the compiled program in a parallel manner, the compiled parallel program agnostic with respect to features provided by the candidate runtime environments, the compile including to static type-check the dataflow-expressed program.

9. The computer readable storage device of claim 8, wherein the dataflow-expressed program expresses the graph as a directed acyclic graph (DAG).

10. The computer readable storage device of claim 9, the static type-check including to statically verify dataflow connections of the DAG.

11. The computer readable storage device of claim 8, wherein each task in the dataflow-expressed program is expressed as an object that specifies each type of each respective input, and a type of the output.

12. The computer readable storage device of claim 8, the static type-check including, for each task, to determine whether a type associated with each input that is supplied to the task matches an expected input type.

13. The computer readable storage device of claim 8, the static type-check including, for each task, to determine whether a number of inputs that are supplied to the task matches an expected number of inputs.

14. The computer readable storage device of claim 8, the static type-check including to identify and correct any mismatch error that is identified.

15. A method performed by a computer system, the method comprising:
receiving a dataflow-expressed program including a plurality of tasks connected together in a manner specified by a graph, each task having at least one input associated with a specified type and an output associated with a specified type; and compiling the dataflow-expressed program to a compiled parallel program expressed in a parallel form that is executable by any runtime environment selected from a plurality of candidate runtime environments providing a plurality of computing resources for executing the compiled program in a parallel manner, the compiled parallel program agnostic with respect to features provided by the candidate runtime environments, the compiling including static type-checking the dataflow-expressed program.

16. The method of claim 15, wherein the dataflow-expressed program expresses the graph as a directed acyclic graph (DAG), the static type-checking including statically verifying dataflow connections of the DAG.

17. The method of claim 15, wherein each task in the dataflow-expressed program is expressed as an object that specifies each type of each respective input, and a type of the output.

18. The method of claim 15, the static type-checking including, for each task, determining whether a type associated with each input that is supplied to the task matches an expected input type.

19. The method of claim 15, the static type-checking including, for each task, determining whether a number of inputs that are supplied to the task matches an expected number of inputs.

20. The method of claim 15, the static type-checking including identifying and correcting any mismatch error that is identified.

* * * * *